United States Patent
Cafaro et al.

(10) Patent No.: US 12,384,523 B2
(45) Date of Patent: Aug. 12, 2025

(54) SYSTEM AND METHOD FOR EFFICIENTLY DETERMINING A PHASE SHIFT IN A PROPULSION SYSTEM

(71) Applicant: General Electric Company, Schenectady, NY (US)

(72) Inventors: Stefan Joseph Cafaro, Chapel Hill, NC (US); Kalpesh Singal, Ballston Spa, NY (US); Eric Richard Westervelt, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/335,340

(22) Filed: Jun. 15, 2023

(65) Prior Publication Data

US 2024/0418131 A1 Dec. 19, 2024

(51) Int. Cl.
| | |
|---|---|
| *B64C 11/50* | (2006.01) |
| *B64D 31/12* | (2006.01) |
| *F02C 9/00* | (2006.01) |
| *F02C 9/42* | (2006.01) |
| *F02K 3/00* | (2006.01) |

(52) U.S. Cl.
CPC .............. *B64C 11/50* (2013.01); *B64D 31/12* (2013.01); *F02C 9/00* (2013.01); *F02C 9/42* (2013.01); *F02K 3/00* (2013.01); *F05D 2270/03* (2013.01); *F05D 2270/13* (2013.01); *F05D 2270/30* (2013.01)

(58) Field of Classification Search
CPC . F02C 9/42; B64D 31/12; B64C 11/50; F05D 2270/03; F05D 2270/13; F05D 2270/30
See application file for complete search history.

(56) References Cited

U.S. PATENT DOCUMENTS

| 4,659,283 A | 4/1987 | Niessen et al. |
| 5,027,277 A | 6/1991 | Schneider |
| (Continued) | | |

FOREIGN PATENT DOCUMENTS

| GB | 636495 A | 5/1950 |

OTHER PUBLICATIONS

Xianghua et al., Synchrophasing Control in a Multi-Propeller Driven Aircraft, 2015, 1836-1841. Retrieved Mar. 30, 2023 from http:/dx.doi.org/10.1109/ACC.2015.7171000.

(Continued)

*Primary Examiner* — Kyle Robert Thomas
(74) *Attorney, Agent, or Firm* — Smith Gambrell & Russell LLP

(57) ABSTRACT

A propulsion system includes at least two propulsors. The at least two propulsors each comprising a fan having a plurality of fan blades. A controller includes memory and one or more processors. The memory stores instructions that when executed by the one or more processors cause the system to perform the following: determine a pairwise phase difference between one propulsor of the at least two propulsors and another propulsor of the at least two propulsors; generate a reference phase angle; determine a target phase shift for each propulsor of the at least two propulsors; and adjust a speed of each propulsor of the at least two propulsors based on the target phase shift until the pairwise phase difference is equal to the reference phase angle.

9 Claims, 7 Drawing Sheets

(56) References Cited

U.S. PATENT DOCUMENTS

| | | |
|---|---|---|
| 5,291,410 A | 3/1994 | Metz |
| 5,551,649 A | 9/1996 | Kaptein |
| 5,789,678 A * | 8/1998 | Pla .......................... B64C 11/50 |
| | | 416/34 |
| 7,611,329 B2 | 11/2009 | Nouhaud |
| 10,800,514 B2 | 10/2020 | Lisio |
| 10,801,360 B2 | 10/2020 | Yakobov |
| 11,312,478 B2 * | 4/2022 | Palumbo ................. B64C 11/50 |
| 2021/0062726 A1 * | 3/2021 | Kathirchelvan .......... F02C 9/00 |

OTHER PUBLICATIONS

Cao et al., A Flight Experimental Platform for Synchrophasing Control Based on a Small Propeller UAV, Science China Technological Sciences, vol. 61, 2018, 1915-1924. https://link.springer.com/article/10.1007/s11431-018-9329-0.

* cited by examiner

SYSTEM AND METHOD FOR EFFICIENTLY DETERMINING A PHASE SHIFT IN A PROPULSION SYSTEM

FIELD

The present subject matter relates generally to a system and method of determining an efficient phase shift in a propulsion system to synchronize the phase angle between propulsors in a propulsion system.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

In an aircraft having two or more engines (i.e., a multi-engine aircraft), phase angle refers to the position of the fan blades on each engine relative to each other. When the fan blades of the engines do not have an optimal phase offset with respect to each other, or when the engines are not rotating at the same speed, it can result in an uneven application of power and torque, causing vibration and noise.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
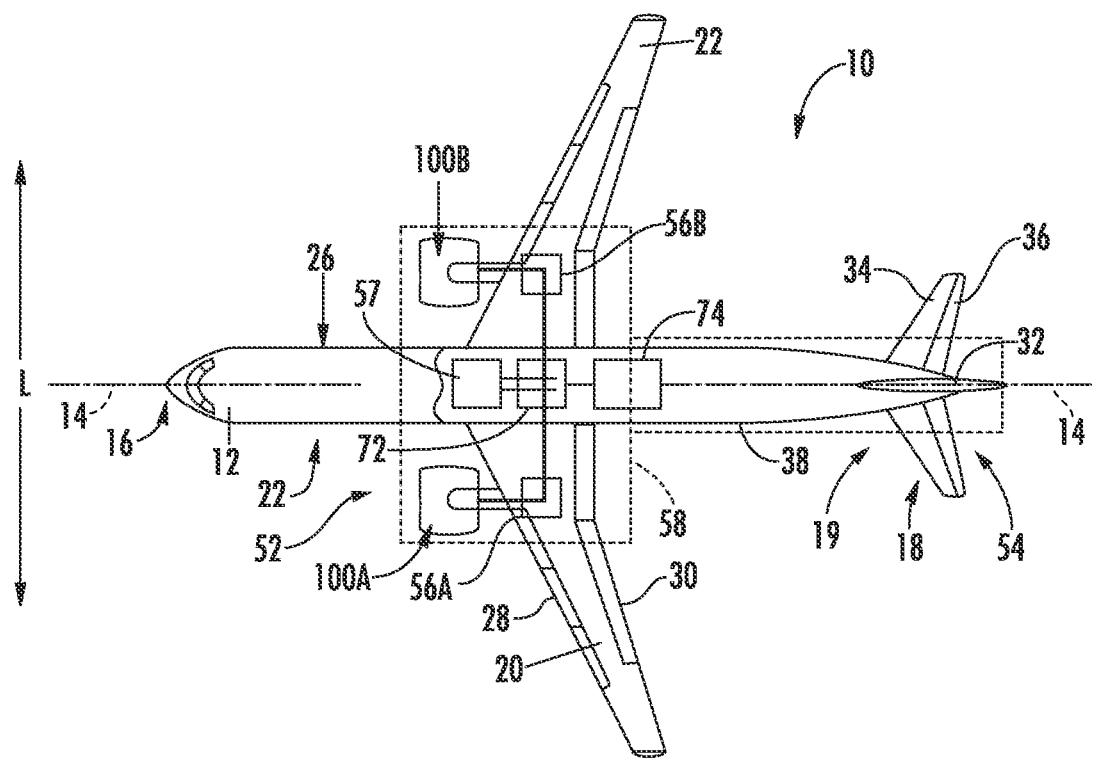
FIG. 1 is a top view of an aircraft according to various exemplary embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In an aircraft having two or more engines (i.e., a multi-engine aircraft), phase angle refers to the position of the fan blades on each engine relative to each other. When the fan blades of the engines do not have an optimal phase offset with respect to each other, or when the engines are not rotating at the same speed, it can result in an uneven application of power and torque, causing vibration and noise.

The present disclosure provides various control methods for generating optimized synchrophasing reference signal to allow a multi-engine propulsion system to synchronize speed and/or phase angle between fan blades. The synchrophasing reference signals may be generated for each engine in the multi-engine propulsion system at least partially by minimizing or otherwise reducing a cost function. As a result, each engine in the multi-engine propulsion system may be independently adjusted (e.g., speed adjusted) according to the synchrophasing reference signal to facilitate synchronization of speed and phase angle between fan blades in a highly efficient manner.

Additionally, with a hybrid electric gas turbine engine, an electric machine may be coupled to one or both of the high pressure system and the low pressure system, such as to a shaft rotatable with the high pressure system and/or the low pressure system. The present disclosure utilizes the electric machine to facilitate synchronization of the phase angle and/or blade speed of the one or more engines in the aircraft. That is, the electric machines may be utilized to apply, extract, or transfer power into the fan and/or propeller shaft of the aircraft engines to accomplish synchronization of speed and/or blade phase from one or more engines to another. The use of embedded electric machines to synchrophase advantageously allows for more rapid removal of phase error with minimal disruption to engine performance or control and can be applied and coordinated across multiple propeller engines either fuel driven or electric driven.

Figure 2:
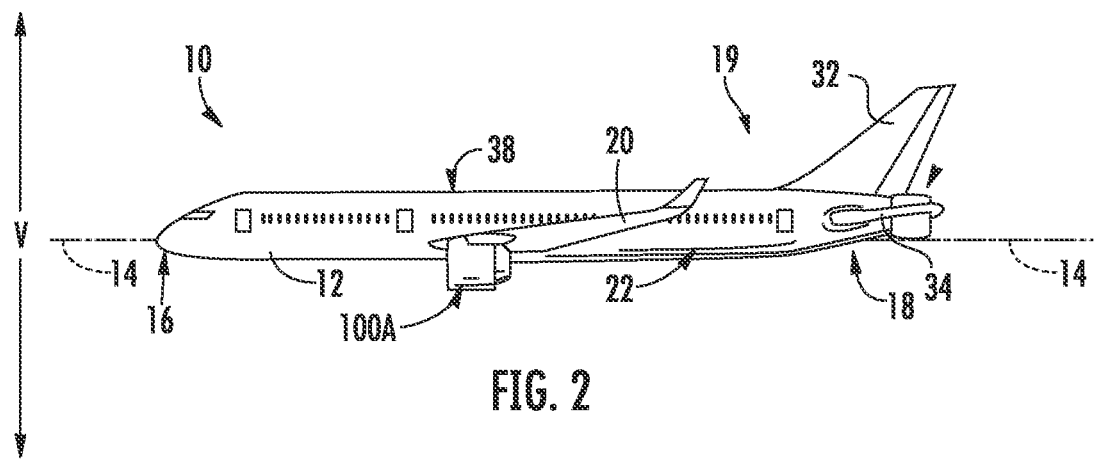
FIG. 2 is a side view of the exemplary aircraft of FIG. 1.

Referring now to the drawings, wherein identical numerals indicate the same elements throughout the figures, FIG. 1 provides a top, schematic view of an aircraft 10 having a hybrid-electric propulsion system 50 in accordance with still another exemplary embodiment of the present disclosure, and FIG. 2 provides a side, schematic view of the exemplary aircraft of FIG. 1. In particular, FIGS. 1 and 2 depict an aircraft 10, the aircraft 10 defining a longitudinal centerline 14 that extends therethrough, a lateral direction L, a forward end 16, and an aft end 18. The aircraft 10 includes a fuselage 12, an empennage 19, a first wing 20, and a second wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

The exemplary aircraft 10 of FIG. 1 additionally includes a hybrid-electric propulsion system 50 having a first gas turbine engine 100A, a second gas turbine engine 100B, and an electric energy storage unit 57. For the embodiment depicted, the first gas turbine engine 100A and second gas turbine engine 100B are each configured in an underwing-mounted configuration. Although FIG. 1 only depicts an aircraft having two gas turbine engines, the aircraft 10 may have any number of gas turbine engines, such as one per wing, two per wing, three per wing, or any other number of gas turbine engines.

Figure 3:
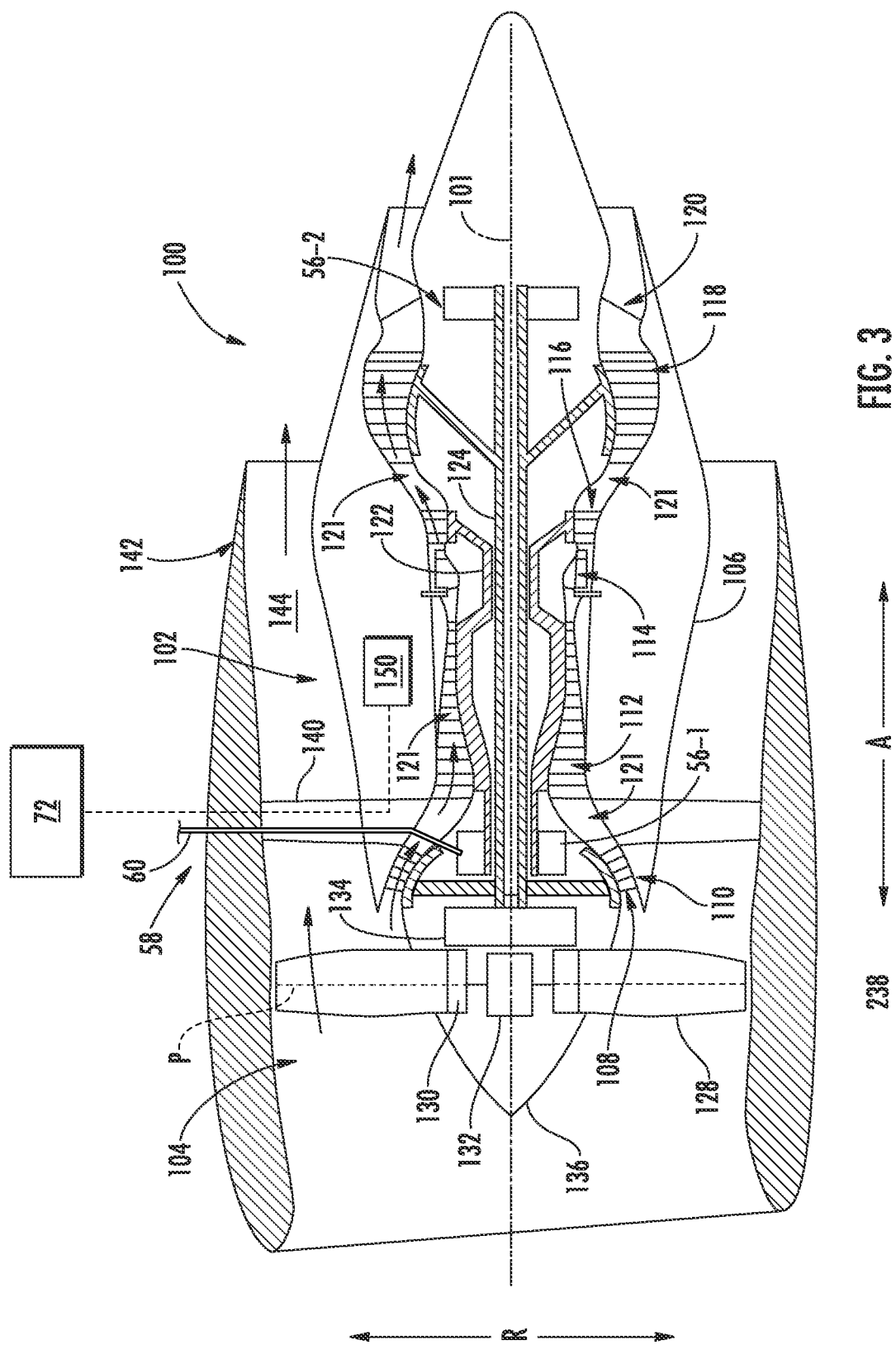
FIG. 3 is a schematic, cross-sectional view of a gas turbine engine in accordance with an exemplary embodiment of the present disclosure, as may be mounted to the exemplary aircraft of FIG. 1.

Referring now also to FIG. 3, a schematic, cross-sectional view is provided of a gas turbine engine 100. The first and second gas turbine engines 100A, 100B depicted in FIGS. 1 and 2 may be configured in a similar manner as the exemplary engine 100 of FIG. 3.

The gas turbine engine 100 of FIG. 3 is more particularly configured as a turbofan engine 100, including a turbomachine 102 and a fan 104. As shown in FIG. 3, the turbofan 100 defines an axial direction A (extending parallel to a longitudinal centerline 101 provided for reference) and a radial direction R. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R. Each fan blade 128 is rotatable relative to the disk 130 about a respective pitch axis P by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 3, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 3, the hybrid-electric propulsion system 50 additionally includes an electric machine 56, which for the embodiment depicted may be configured as an electric motor/generator. The electric machine 56 is, for the embodiment depicted, positioned within the turbomachine 102 of the turbofan engine 100 and is in mechanical communication with one of the shafts of the turbofan engine 100. More specifically, for the embodiment depicted, the electric machine 56 is a first electric machine 56-1, and is positioned inward of the core air flowpath 121, driven by the first, HP turbine 116 through the HP shaft 122. The first electric machine 56-1 is configured to convert mechanical power of the HP shaft 122 to electric power during certain operations, and further is configured to convert electrical power to mechanical power in other operations. Accordingly, the first electric machine 56-1 may be powered by the HP system (including the HP turbine 116) of the turbomachine 102 during certain operations and may power the HP system during other operations.

Further for the embodiment depicted, the hybrid-electric propulsion system 50 additionally includes a second electric machine 56-2. The second electric machine 56-2 is configured to convert mechanical power of the LP shaft 124 to electric power during certain operations, and further is configured to convert electrical power to mechanical power in other operations. Accordingly, the second electric machine 56-2 may be powered by the LP system (including the LP turbine 118 and the fan 104) of the turbomachine 102 during certain operations and may power the LP system during other operations.

Notably, the electric machines 56-1, 56-2 may be relatively powerful motor/generators. For example, in some embodiments, during certain operations, the electric machines 56-1, 56-2 may be configured to generate at least about fifty kilowatts of electrical power or at least about sixty-five horsepower of mechanical power. In other embodiments, the electric machines 56-1, 56-2 may be configured to generate up to two hundred kilowatts of electrical power. In other embodiments, however, the electric machines 56-1, 56-2 may generate other amounts of power.

It should be appreciated, however, that in other exemplary embodiments, the electric machines 56-1, 56-2 may instead be positioned at any other suitable location within the turbomachine 102 or elsewhere, and may be, e.g., powered in any other suitable manner. For example, the first electric machine 56-1 may be, in other embodiments, mounted coaxially with the HP shaft 122 within the turbine section, or alternatively may be offset from the HP shaft 122 and driven through a suitable gear train. Similarly, the second electric machine 56-2 may be, in other embodiments, mounted coaxially with the LP shaft 124 within the compressor section, or alternatively may be offset from the LP shaft 124 and driven through a suitable gear train. Additionally, or alternatively, still, in other embodiments, the hybrid electric propulsion system 50 may not include both the first and second electric machines 56-1, 56-2, and instead may only include one of such electric machines 56-1, 56-2.

It should further be appreciated that the exemplary turbofan engine 100 depicted in FIG. 3 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor 52 may include any other suitable type of engine. For example, in other embodiments, the turbofan engine 100 may instead be configured as a turboprop engine or an unducted turbofan engine. Additionally, in still other embodiments, the turbofan engine 100 may instead be configured as any other suitable combustion engine for driving the electric machines 56-1, 56-2. For example, in other embodiments, the turbofan engine may be configured as a turboshaft engine, or any other suitable combustion engine (such as an unducted, open rotor engine).

Referring still to FIGS. 1 and 2, the turbofan engine 100 further includes a controller 150, and although not depicted, one or more sensors. The controller 150 may be a full authority digital propulsor control system, also referred to as a FADEC. The controller 150 of the turbofan engine 100 may be configured to control operation of, e.g., the actuation member 132, a fuel delivery system 151 to the combustion section 114 (the controller 150 may be operable to adjust an amount of fuel provided to the combustion section 114 by the fuel delivery system 151), etc. Additionally, the controller 150 may be operably connected to the one or more sensors to receive data from the sensors and determine various operational parameters of the turbofan engine 100. For example, the controller 150 may determine one or more of an exhaust gas temperature, a rotational speed of the core (i.e., a rotational speed of the HP system), a compressor discharge temperature, etc. Further, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first and second gas turbine engines 100A, 100B, the energy storage unit 57, etc. through a suitable wired or wireless communication system (depicted in phantom).

Referring back particularly to FIGS. 1 and 2, an electrical system of the hybrid-electric propulsion system 50 includes one or more electric machines (e.g., electric machine 56A, depicted schematically) mechanically coupled to the first gas turbine engine 100A and one or more electric machines (e.g., electric machine 56B, depicted schematically) mechanically coupled to the second gas turbine engine 100B. Although depicted schematically outside the respective gas turbine engines 100A, 100B, in certain embodiments, the electric machines 56A, 56B may be positioned within a respective one of the gas turbine engines 100A, 100B (see, e.g., FIG. 3). Further, although a single electric machine is depicted with each gas turbine engine 100A, 100B, in certain embodiments, a plurality of electric machines 56A, 56B may be provided for each (e.g., electric machines 56A-1, 56A-2 with gas turbine engine 100A, electric machines 56B-1, 56B-2 with gas turbine engine 100B).

Moreover, as briefly mentioned above with reference to FIG. 3, for the embodiment of FIGS. 1 and 2 the hybrid electric propulsion assembly 50 further includes a controller 72. As will be appreciated, the energy storage unit 57 may be configured, in certain operating conditions, to receive electrical power from one or both of the first electric machine 56A and the second electric machine 56B, and may further be configured in certain operating conditions to provide stored electrical power to one or both of the first electric machine 56A and the second electric machine 56B. Moreover, the controller 72 is operably connected to turbofan engines 100A, 100B, electric machines 56A, 56B, and energy storage unit 57 to, e.g., control operations of the hybrid electric propulsion system 50 and selectively electrically connect components of the hybrid electric propulsion system 50 during the various operating conditions.

Further, the controller 72 may be in communication with one or more aircraft controllers for receiving data indicative of an aircraft need for electrical power, and may in response provide electrical power from one or more of the electric machines 56A, 56B and the energy storage unit 57 to an aircraft load 74.

It should be appreciated, however, that in still other exemplary embodiments of the present disclosure, any other suitable aircraft 10 may be provided having a hybrid-electric propulsion system 50 configured in any other suitable manner. For example, in other embodiments, the turbofan engines 100A, 100B may each be configured as any other suitable combustion engine (e.g., turboprop engine, unducted turbofan engine, turboshaft engine, turbojet engine, etc.), and may be mounted at any other suitable location.

Moreover, in still other exemplary embodiments, the exemplary hybrid electric propulsion system 50 may have still other configurations. For example, referring now briefly to FIG. 4, a schematic diagram of a hybrid-electric propulsion system 50 in accordance with yet another exemplary embodiment of the present disclosure is provided. The exemplary hybrid electric propulsion system 50 depicted in FIG. 4 may be similar to one or more the exemplary hybrid electric propulsion systems 50 described above with reference to FIGS. 1 through 3.

In various embodiments, the hybrid electric propulsion system 50 may include at least two propulsors. For example, the hybrid electric propulsion system 50 may include a first propulsor 52 and a second propulsor 54. The first propulsor 52 generally includes a first engine 100A having first turbomachine 102A and a first fan 104A, and a second engine 100B having a second turbomachine 102B and a second fan 104B. Each of the first and second turbomachines 102A, 102B generally includes a low pressure system having a low pressure compressor 110A, 110B drivingly coupled to a low pressure turbine 118A, 118B through a low pressure shaft 124A, 124B as well as a high pressure system having a high pressure compressor 112A, 112B drivingly coupled to a high pressure turbine 116A, 116B through a high pressure shaft 122A, 122B.

Additionally, the first fan 104A is drivingly coupled to the low pressure system of the first turbomachine 102A (e.g., via the low pressure shaft 124A) and the second fan 104B is drivingly coupled to the low pressure system of the second turbomachine 102B (e.g., via the high pressure shaft 124B). In certain exemplary embodiments, the first fan 104A and first turbomachine 102A may be configured as a first turbofan engine and, similarly, the second fan 104B and second turbomachine 102B may be configured as a second turbofan engine (see, e.g., FIG. 3). Alternatively, however, these components may instead be configured as parts of a turboprop engine or any other suitable turbomachine-driven propulsion device.

Figure 4:
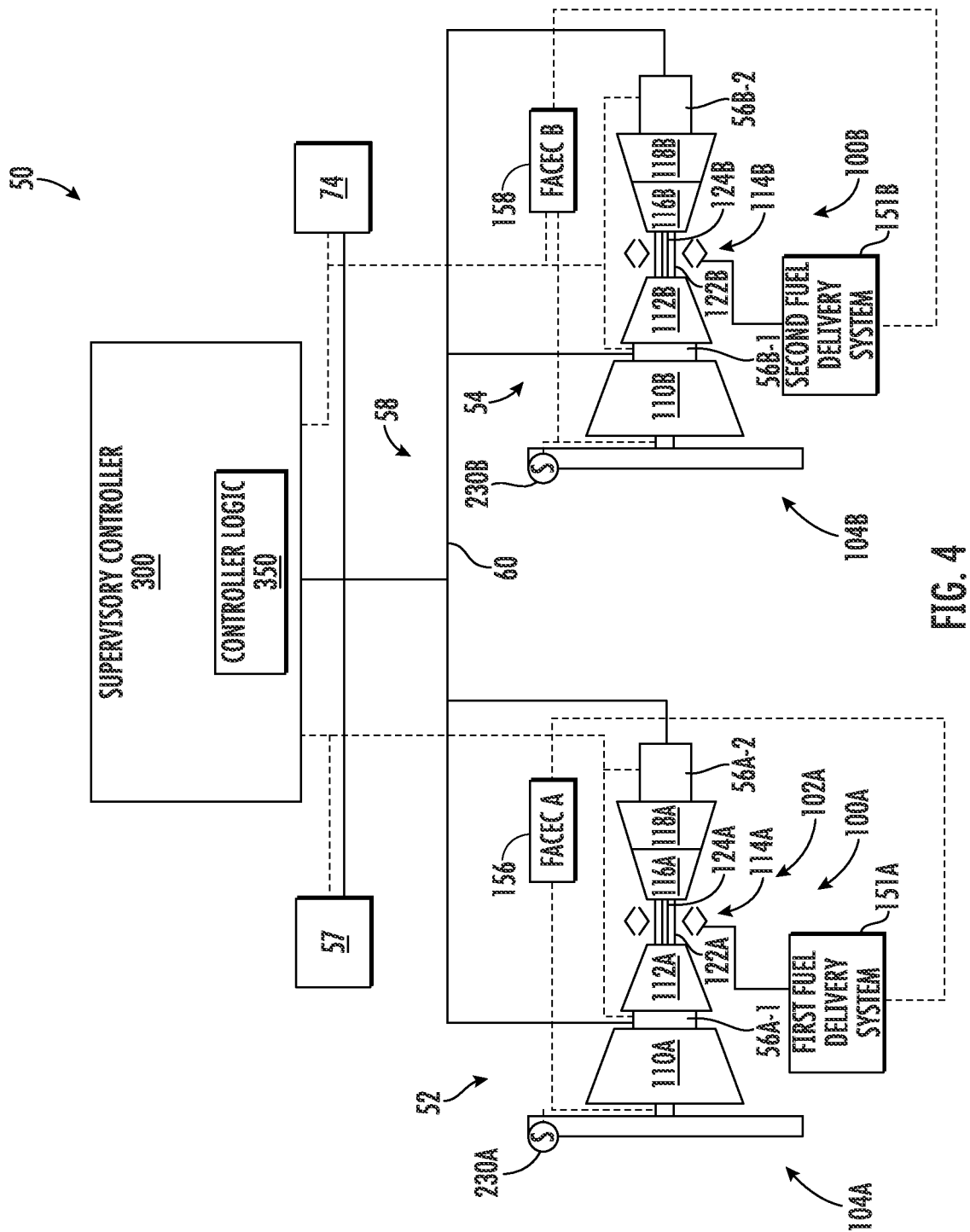
FIG. 4 is a schematic view of a propulsion system in accordance with an exemplary embodiment of the present disclosure.

Moreover, the hybrid electric propulsion system 50 of FIG. 4 additionally includes an electrical system. More specifically, the hybrid electric propulsion system 50 includes one or more electric machines operable with the first engine 100A, the second engine 100B, or both, and an electric energy storage unit 57 electrically connectable to one or more of these electric machines. In particular, for the embodiment depicted, the hybrid electric propulsion system 50 includes a first electric machine 56A-1 and a second electric machine 56A-2 operable with the first engine 100A and a first electric machine 56B-1 and a second electric machine 56B-2 operable with the second engine 100B.

More specifically, for the embodiment depicted in FIG. 4, the first electric machines 56A-1, 56B-1 are each coupled to the high pressure systems of the respective turbomachines 102A, 102B (such as coupled to the high pressure shaft 124A, 124B) and the second electric machines 56A-2, 56B-2 are each coupled to the low pressure systems of the respective turbomachines 102A, 102B (such as coupled to the low pressure shaft 122A, 122B).

In many embodiments, each of the turbomachines 100A, 100B may each include a fuel delivery system 151A, 151B. For example, the first turbomachine 100A may include a first fuel delivery system 151A that is fluidly connected with the combustion section 114A of the first turbomachine 100A. Similarly, the second turbomachine 100B may include a second fuel delivery system 151B that is fluidly connected with the combustion section 114B of the second turbomachine 100B. The fuel delivery systems 151A, 151B may each include one or more fuel supplies (such as a fuel tank), one or more fuel pumps, one or more valves, and a fuel controller. The Fuel delivery systems 151A, 151B may be operable to adjust an amount of fuel supplied to the respective combustion systems 114A, 114B (e.g., by actuating the one or more valves). The fuel controller for each fuel delivery system 151A, 151B may be integrated into the FADEC or may be a standalone controller. The fuel controller may be operably connected to one or more pumps and/or the one or more valves of the fuel delivery system, such that the fuel controller may adjust an amount of fuel supplied to the combustion section (e.g., by setting a fuel command, thereby actuating the one or more valves and/or modifying a power level of the one or more pumps).

As is also depicted in FIG. 4, the exemplary hybrid electric propulsion system 50 further includes a power bus 58. The first electric machines 56A-1, 56A-2, the second electric machines 56B-1, 56B-2, and the electric energy storage unit 57 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough. The various switches and other power electronics may be operably coupled to the controller, such that the controller may control the power flow to and/or from the first electric machines 56A-1, 56A-2, the second electric machines 56B-1, 56B-2, and the electric energy storage unit 57.

Moreover, as is also depicted in the example of FIG. 4, the power bus 58 is electrically connected to one or more aircraft systems 74 for providing electrical power from one or more of the first electric machines 56A-1, 56A-2, the second electric machines 56B-1, 56B-2, and the electric energy storage unit 57 to the one or more aircraft systems 74. The one or more aircraft systems 74 may include, e.g., environmental controls, aircraft controls, hydraulic systems, pumps, de-icing systems, navigation, illumination, heating, etc.

In many embodiments, the propulsion system 50 may include one or more sensors operably connected to any of (or all of) FADEC A 156, FADEC B 158, and the supervisory controller 300, such that the one or more sensors may provide sensed data to the controllers. The one or more sensors may each be coupled to a propulsor 52, 54 and may each be configured to sense data indicative of an angle of the fan blades relative to a reference line. For example, the one or more sensors may include a first sensor 230A coupled to the first propulsor 52 and a second sensor 230B coupled to the second propulsor 54. The first sensor 230A may be operable to sense data indicative of a first angle of the blades of the first fan 104A relative to a reference line (such as a vertical reference line). Similarly, the second sensor 230B may be operable to sense data indicative of a second angle of the blades of the second fan 104B relative to a reference line (such as a vertical reference line). The supervisory controller 300 may receive the data indicative of the first angle and the data indicative of the second angle, and the supervisory controller 300 may determine a pairwise phase difference between the first propulsor and the second propulsor (i.e., or a phase angle between the first propulsor 52 and the second propulsor).

In addition, the system depicted in FIG. 4 includes a supervisory controller 300, which may be similar to controller 72 described above, a first gas turbine engine controller 156 (which may be, e.g., a FADEC controller) and a second gas turbine engine controller 158 (which may also be, e.g., a FADEC controller). The supervisory controller 300 may receive data indicative of one or more operability parameters of the first gas turbine engine 100A, the second gas turbine engine 100B, or both. For example, the exemplary supervisory controller 300 may receive data indicative of: one or more fuel flows, one or more operating temperatures (e.g., an exhaust gas temperature, compressor exit temperature, turbine inlet temperature, etc.), one or more speeds of the gas turbine engines (e.g., a rotational speed of the low pressure system, a rotational speed of the high pressure system, a rotational speed of the fan/propeller, etc.), a phase angle difference between the fan/propeller of each propulsor, one or more shaft torques, one or more pressure measurements, one or more thrust outputs (which may be, e.g., a calculation from a combination of a fan/propeller speed and a fan/propeller pitch angle), identifying serial numbers of component or other unique component identifiers (such as of the one or more engines), estimates or measurements of component consumed or residual life or performance, any combination of these or calculation derived from these, etc.

Particularly, the supervisory controller 300 may receive, e.g., from the sensors 230A, 230B, data indicative of an angle of the fan blades of each of the fans 104A, 104B relative to a vertical reference line at an instance in time. The supervisory controller 300 may utilize the data indicative of the angle to determine a phase angle between the first fan 104A and the second fan 104B. As used herein, in an aircraft or propulsion system having multiple propulsors, "phase angle" refers to the position of the fan blades on a first fan of a first propulsor of the multiple propulsors relative to the position of the fan blades on a different fan of a different propulsor the multiple propulsors.

The supervisory controller 300 includes controller logic 350. The controller logic 350 can be a set of computer-executable instructions stored in the memory that, when executed by one or more processors of the supervisory controller 300, cause the one or more processors to implement a synchrophasing control scheme. In implementing the synchrophasing control scheme, the one or more processors can: determine a phase angle between the first fan 104A and the second fan 104B; generate a reference phase angle (e.g., a desired phase angle between the first fan 104A and the second fan 104B); determine a target phase shift for each fan 104A, 104B; and cause a speed of each propulsor 52, 54 to be adjusted based on the target phase shift until the phase angle is equal to the reference phase angle. For example, the supervisory controller 300 may instruct the propulsion system 50 to adjust a speed of each propulsor 52, 54 of the at least two propulsors based on the target phase shift until the pairwise phase difference is equal to the reference phase angle. Particularly, adjusting the speed of each propulsor 52, 54 may include adjusting an amount of fuel provided to the combustion section 114A, 114B of each propulsor 52, 54 from the fuel delivery systems 151A, 151B based on the target phase shift (e.g., increasing or decreasing the amount of fuel provided). Additionally, or alternatively, adjusting the speed of each propulsor may include adjusting an amount of power transferred between the electric machines 56A-1, 56A-2, 56B-1, 56B-2 and the shaft 122 and/or 124. For example, adjusting an amount of power transferred between the electric machines 56A-1, 56A-2, 56B-1, 56B-2 and the shaft 122 and/or 124 may include any of the following: (1) transferring power from the first engine 100A to the second engine 100B, or vice versa; (2) transferring power from the electric energy storage unit 57, the first engine 100A, or both to the second engine 100B, or from the electric energy storage unit 57, the second engine 100B, or both to the first engine 100A; (3) transferring power from a low pressure system of one of the first or second engines 100A, 100B to a high pressure system of the same engine, or vice versa; and/or (4) extracting a different amount of power from the first and second engines 100A, 100B. In such a manner, the system may adjust the phase angle between the fans 104A, 104B to a reference phase angle (such as zero in some embodiments, or non-zero in other embodiments and/or may synchronize the speed of the fans 104A, 104B.

Figure 5:
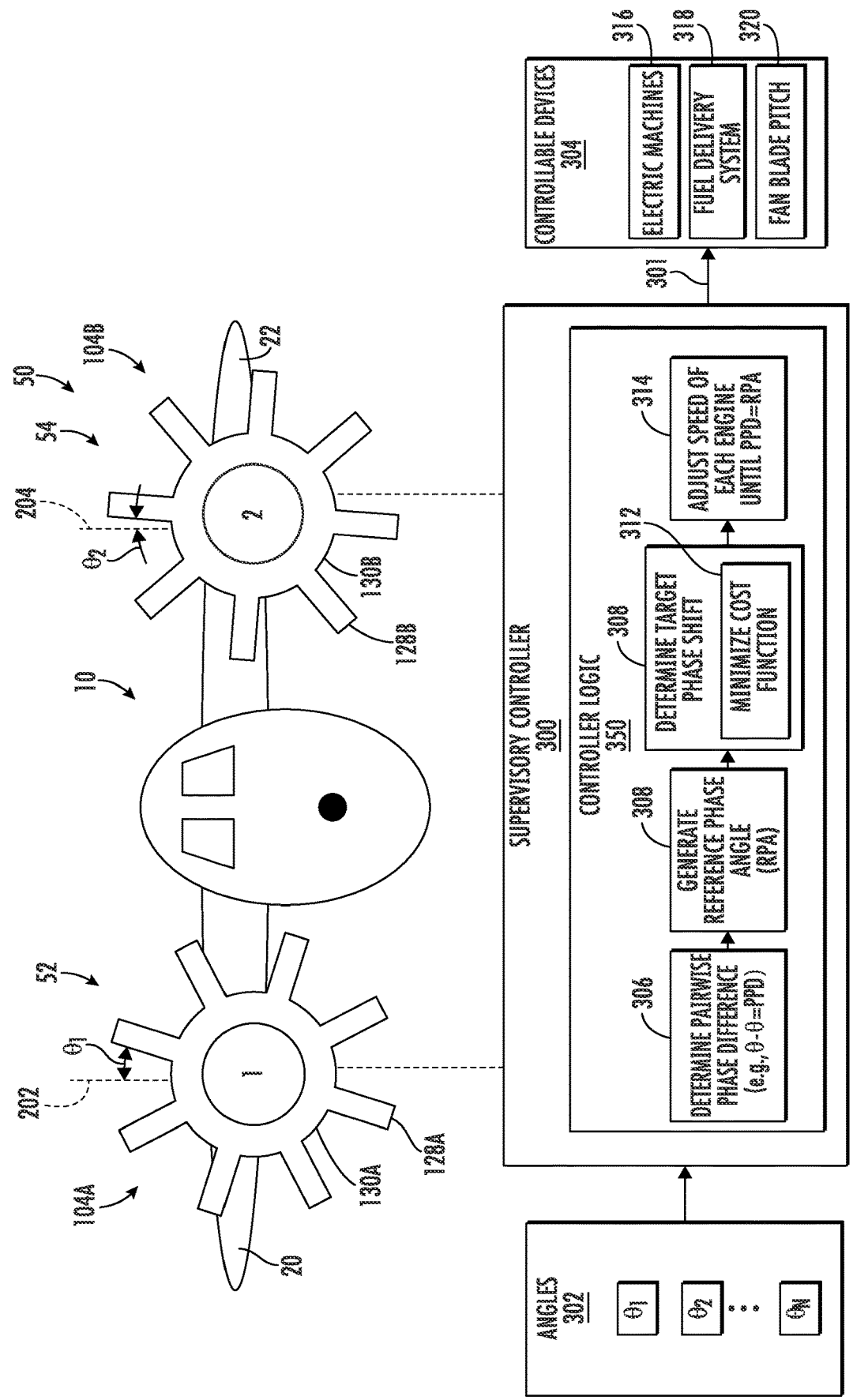
FIG. 5 is a front view of an aircraft having a propulsion system with two propulsors in accordance with embodiments of the present disclosure.
Figure 6:
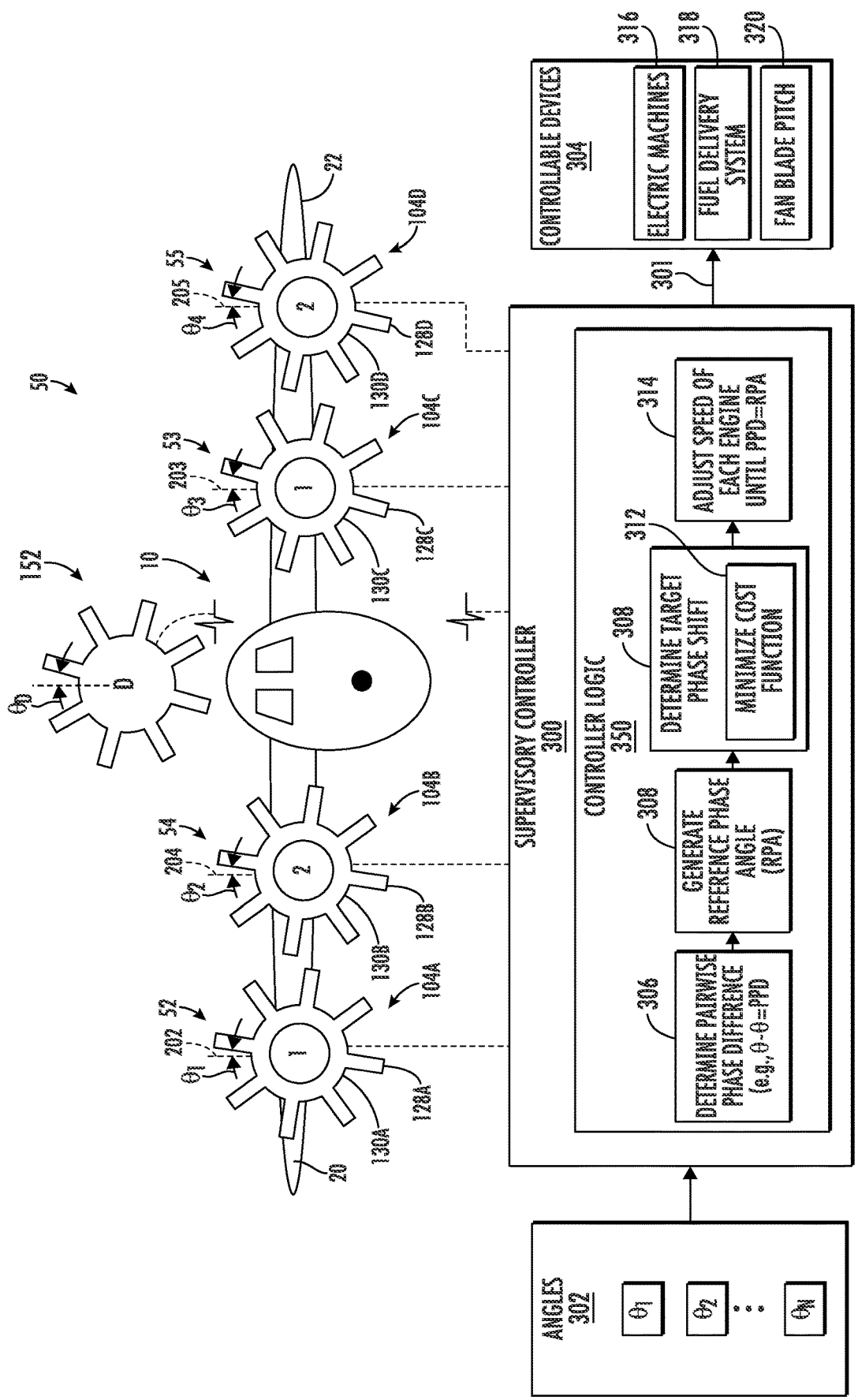
FIG. 6 is a front view of an aircraft having a propulsion system with four propulsors in accordance with embodiments of the present disclosure.

FIGS. 5 and 6 each illustrate a schematic view of an aircraft 50 having a propulsion system 50 with at least two propulsors in accordance with embodiments of the present disclosure. Particularly, FIG. 5 illustrates a propulsion system 50 having two propulsors (e.g., a first propulsor 52 mounted on a first wing 20 of the aircraft 10, and a second propulsor 54 mounted on the second wing 22 of the aircraft 10). Each of the propulsors 52, 54 may be configured similarly to the gas turbine engine 100 shown in FIG. 3 and described above. FIG. 6, illustrates a propulsion system 50 having four propulsors (e.g., a first propulsor 52 and a second propulsor 54 mounted on the first wing 20 of the aircraft 10, and a third propulsor 53 and a fourth propulsor 55 mounted on the second wing 22 of the aircraft 10). Each of the propulsors 52, 53, 54, 55 may be configured similarly to the gas turbine engine 100 shown in FIG. 3 and described above.

Each of the propulsors 52, 53, 54, 55 may include a fan (e.g., a first fan 104A, a second fan 104B, a third fan 104C, and a fourth fan 104D) having a plurality of fan blades. For example, the first fan 104A may have a first plurality of fan blades 128A that extend outwardly (e.g., radially outwardly) from a first disk 130A. The second fan 104B may have a second plurality of fan blades 128B that extend outwardly (e.g., radially outwardly) from a second disk 130B. The third fan 104C may have a third plurality of fan blades 128C that extend outwardly (e.g., radially outwardly) from a third disk 130C. The fourth fan 104D may have a fourth plurality of fan blades 128D that extend outwardly (e.g., radially outwardly) from a fourth disk 130D. Referring briefly back to FIG. 3, each fan blade 128 is rotatable relative to the disk 130 about a respective pitch axis P by virtue of the fan blades 128 being operatively coupled to a suitable actuation member 132 configured to collectively vary the pitch of the fan blades 128.

Each of the propulsors 52, 53, 54, 55 may define a top dead center (TDC) reference line. The TDC reference line may extend vertically (e.g., along the vertical direction V) through a center point of the respective propulsor 52, 53, 54, 55 (e.g., the TDC reference line may intersect the longitudinal centerline 101 shown in FIG. 3). Particularly, the first propulsor 52 may include a first TDC reference line 202, the second propulsor 54 may include a second TDC reference line 204, the third propulsor 53 may include a third TDC reference line 203, and the fourth propulsor 55 may include a fourth TDC reference line 205. Notably, the reference lines (such as the TDC reference lines) do not necessarily need to be vertical for calculation of the phase angles, so long as the reference line for each propulsor is similarly oriented (e.g., parallel) and extending through (or intersecting) the center of the respective propulsor.

The propulsion system 50 may include a supervisory controller 300, which may include one or more processors and one or more memory devices. Additionally, the supervisory controller 300 may include controller logic 350, which can be a set of computer-executable instructions stored in the memory that, when executed by one or more processors of the supervisory controller 300, cause the one or more processors to implement a synchrophasing control scheme.

In many embodiments, as shown in FIG. 6, the supervisory controller may further include a digital propulsor 352. The digital propulsor 352 may virtually represent an additional propulsor. The digital propulsor 352 may include parameters and dimensions of one or more or the physical propulsors 52, 53, 54, 55 parameters and dimensions that provide measured values and keeps the values of those parameters and dimensions current by receiving and updating values via outputs from sensors embedded in the physical propulsors 52, 53, 54, 55. The digital propulsor 352 may have respective virtual components that correspond to essentially all physical and operational components of the physical propulsors 52, 53, 54, 55. In this way, the supervisory controller 300 may utilize the digital propulsor 352 as a substitute for, or in addition to, one or more of the physical propulsors 52, 53, 54, 55 for the determining of pairwise phase difference, the generating of a reference phase angle, the determining of target phase shift, and/or the adjusting of each engine speed until the pairwise phase difference is equal to the reference phase angle.

The supervisory controller 300 may be in operable communication with each of the propulsors 52, 53, 54, 55, such that the supervisory controller 300 may receive data indicative of operating parameters associated with the propulsors 52, 53, 54, 55. For example, the exemplary supervisory controller 300 may receive data indicative of: one or more fuel flows, one or more operating temperatures (e.g., an exhaust gas temperature, compressor exit temperature, turbine inlet temperature, etc.), one or more speeds of the gas turbine engines (e.g., a rotational speed of the low pressure system, a rotational speed of the high pressure system, a rotational speed of the fan/propeller, etc.), one or more shaft torques, one or more pressure measurements, one or more thrust outputs (which may be, e.g., a calculation from a combination of a fan/propeller speed and a fan/propeller pitch angle), a vibration measurement or estimate of each engine or a vibration associated with a component of each engine, etc.

As shown in FIGS. 5 and 6, at a particular instance in time (i.e., a moment in time), the supervisory controller 300 may determine or receive (e.g., by measuring, sensing, or estimating) a set of angles 302 between a fan blade 128 of each of the fans and a reference line. The angles 302 may then be compared to one another to determine a pairwise phase difference between a respective pair of angles 302. The angles 302 may be defined in the vertical-longitudinal plane (e.g., the plane of FIGS. 5 and 6). For example, the first propulsor 52 defines a first angle $\theta_1$ between the first reference line 202 and a fan blade 128A of the first plurality of fan blades 128A closest to the first TDC reference line 202 at an instance in time. The second propulsor 54 defines a second angle $\theta_2$ between the second reference line 204 and a fan blade 128B of the second plurality of fan blades 128B closest to the second TDC reference line 204 at the instance in time. The third propulsor 53 defines a third angle $\theta_3$ between the third TDC reference line 204 and a fan blade 128C of the third plurality of fan blades 128C closest to the third TDC reference line 204 at the instance in time. The fourth propulsor 55 defines a fourth angle $\theta_4$ between the fourth TDC reference line 205 and a fan blade 128D of the fourth plurality of fan blades 128D closest to the third TDC reference line 205 at the instance in time. For example, the angles 302 may be between about 0° and about 360°, or such as between about 0° and about 180°, or such as between about 0° and about 90°, or such as between about 0° and about 30°, or such as between about 0° and about 5°.

In some embodiments, the supervisory controller 300 may receive the angles 302 from one or more sensors, e.g., the sensors 230 described above with reference to FIG. 4. In other embodiments, the angles 302 may be estimated (e.g., calculated), e.g., based on other operating parameters of the aircraft 10 and/or the propulsors 52, 53, 54, 55, such as the speed of the LP shaft, the speed of the HP shaft, and/or a vibration of the propulsors. For example, the angles may be calculated by comparing the various speeds of each of the propulsors 52, 53, 54, 55 relative to one another or relative to a digital propulsor.

As shown in FIGS. 5 and 6, the control logic 350 may include at (306) determining a pairwise phase difference (PPD) between one propulsor of the at least two propulsors and another propulsor of the at least two propulsors. A pairwise phase difference (i.e., the phase angle for a particular two propulsors) may be the difference between the angle $\theta$ of one propulsor of the at least two propulsors and the angle $\theta$ of another propulsor of the at least two propulsors at an instance in time. For example, for the embodiment shown in FIG. 5, the PPD may be the difference between the first angle $\theta_1$ and the second angle $\theta_2$ at the instance in time.

For the embodiment shown in FIG. 6 (e.g., embodiments having more than two propulsors), the controller logic 350 may determine multiple PPD for a particular propulsor relative to the other propulsors. For example, in implementations where the first propulsor 52 is the reference propulsor, a first $PPD_{12}$ between the first propulsor 52 and the second propulsor 54 may be determined by taking the difference between the first angle $\theta_1$ and the second angle $\theta_2$ at an instance in time; a second $PPD_{13}$ between the first propulsor 52 and the third propulsor 53 may be determined by taking the difference between the first angle $\theta_1$ and the third angle $\theta_3$ at the instance in time; and a third $PPD_{14}$ between the first propulsor 52 and the fourth propulsor 55 may be determined by taking the difference between the first angle $\theta_1$ and the third angle $\theta_4$ at the instance in time. In some instances, each of $PPD_{12}$, $PPD_{13}$, $PPD_{14}$ may be the same (e.g., equal to one another). In other instances, each of $PPD_{12}$, $PPD_{13}$, $PPD_{14}$ may not be the same (e.g., unequal to one another).

Additionally, in many embodiments, the controller logic 350 may include at (308) generating reference phase angle(s) (RPA) that is different than the current pairwise phase difference. The reference phase angle(s) may be the desired phase angle(s) (i.e., the desired pairwise phase difference(s)) between the propulsors. The RPA(s) may be generated based on one or more gas turbine operating parameters, such as vibration, speed, or other parameters. In many implementations, the RPA(s) may be equal to zero, such that after the phase shift has occurred, the phase angle or pairwise phase difference is equal to zero. Alternatively, the RPA(s) may be non-zero, such that after the phase shift has occurred, the phase angle or pairwise phase difference is equal to the non-zero value.

In the embodiment shown in FIG. 5, the supervisory controller 300 may generate only one reference phase angle $RPA_{12}$ between the first propulsor 52 and the second propulsor 54. For the embodiment shown in FIG. 6, the supervisory controller 300 may generate a plurality of RPAs all relative to the same reference propulsor. For example, taking the first propulsor as the reference propulsor, the supervisory controller 300 may generate: a first $RPA_{12}$ between the first propulsor 52 and the second propulsor 54; a second $RPA_{13}$ between the first propulsor 52 and the third propulsor 53; and a third $RPA_{14}$ between the first propulsor 52 and the fourth propulsor 55.

In exemplary embodiments, the controller logic 350 may include at (310) determining a target phase shift (TPS) for each propulsor of the at least two propulsors at least partially based on the reference phase angle and the pairwise phase difference. The target phase shift may be an amount (e.g., in degrees) that the angles 302 of each propulsor may be adjusted (e.g., by adding/removing power with an electric machine, adjusting an amount of fuel provided to the combustion section, and/or adjusting a pitch of the fan blades) to achieve the RPA.

In exemplary implementations, the TPS may be determined at (312) by minimizing a cost function. The cost function is mathematical function that represents the objective or goal that the system is trying to achieve. In this case, the goal of the cost function is to minimize the phase shift (e.g., the minimum amount each angle θ needs to be adjusted to collectively achieve the RPA). In this way, each of the propulsors may shift phase independently of one another to achieve the RPA in the most efficient manner.

Particularly, for the embodiment shown in FIG. 5 (e.g., an aircraft 10 having two propulsors) the objective of the cost function may be to minimize the following equation (the cost function):

$$TPS_1^2 + TPS_2^2. \tag{1}$$

In equation (1), $TPS_1$ is the target phase shift of the first propulsor, and $TPS_2$ is the target phase shift of the second propulsor. The above equation (1), i.e., the cost function, may be subject to the following equations (e.g., the following equation must remain true when the cost equation is minimized):

$$TPS_1 + TPS_2 = PPD_{12} - RPA_{12}. \tag{2}$$

In equation (2), $PPD_{12}$ is the current pairwise phase difference between the first propulsor 52 and the second propulsor 54, which may be determined by taking the difference between the first angle $\theta_1$ and the second angle $\theta_2$ at an instance in time (e.g., the current instance in time), and $RPA_{12}$ is the reference phase angle (e.g., the desired or target phase angle) between the first propulsor 52 and the second propulsor 54. The cost equation may be minimized iteratively by the supervisory controller (e.g., continually testing $TPS_1$ and $TPS_2$ values to converge on a minimum of the cost function while keeping equation 2 true). That is, the cost function may be minimized iteratively by continually testing $TPS_1$ and $TPS_2$ to converge on a $TPS_1$ and $TPS_2$ for each propulsor of the at least two propulsors while keeping equation (2) ture.

The cost function may be different for the embodiment shown in FIG. 6 (e.g., aircrafts having more than two propulsors and/or a digital propulsor). For example, for the embodiment shown in FIG. 6, the objective of the cost function may be to minimize the following equation:

$$k_1(TPS_1^2) + k_2(TPS_2^2) + k_3(TPS_3^2) + k_4(TPS_4^2). \tag{3}$$

In equation (3), $TPS_1$ is the target phase shift of the first propulsor 52; $TPS_2$ is the target phase shift of the second propulsor 54; $TPS_3$ is the target phase shift for the third propulsor 53; and $TPS_4$ is the target phase shift for the fourth propulsor 55. Additionally, $k_1$, $k_2$, $k_3$, $k_4$ may each be energy costs associated with the phase shift of each propulsor (or any other operational costs), which may be a constant value, and which may be predetermined and stored in the memory, or which may be calculated based on operating conditions.

Notably, the cost functions, e.g., equations (1) and (3), discussed above serve as examples of a cost function which may be minimized to determine the target phase shift(s) the system described herein. It will be appreciated that the system described herein may utilize other cost functions for determining/generating the target phase shift(s) of each engine at least partially based on the reference phase angle and the pairwise phase difference, and the present subject matter should not be limited to any particular cost function unless specifically recited in the claims.

The above equation (3), i.e., the cost function, may be subject to the following equations (e.g., the following equation must remain true when the cost equation is minimized):

$$TPS_1 + TPS_D = 0 \tag{4}$$

$$TPS_1 + TPS_2 = PPD_{12} - RPA_{12} \tag{5}$$

$$TPS_1 + TPS_3 = PPD_{13} - RPA_{13} \tag{6}$$

$$TPS_1 + TPS_4 = PPD_{14} - RPA_{14}. \tag{7}$$

In equations (4)-(7), $PPD_{12}$ is the current pairwise phase difference between the first propulsor 52 and the second propulsor 54, which may be determined by taking the difference between the first angle $\theta_1$ and the second angle $\theta_2$ at an instance in time; $PPD_{13}$ is the current pairwise phase difference between the first propulsor 52 and the third propulsor 53, which may be determined by taking the difference between the first angle $\theta_1$ and the third angle $\theta_3$ at the instance in time; and $PPD_{14}$ is the current pairwise phase difference between the first propulsor 52 and the fourth propulsor 55, which may be determined by taking the difference between the first angle $\theta_1$ and the fourth angle $\theta_4$ at the instance in time. $TPS_D$ is the target phase shift of the digital propulsor 152. Additionally, a first $RPA_{12}$ between the first propulsor 52 and the second propulsor 54; a second $RPA_{13}$ between the first propulsor 52 and the third propulsor 53; and a third $RPA_{14}$ between the first propulsor 52 and the fourth propulsor 55.

As shown in equation (4), a pairwise phase difference between the digital propulsor 152 and at least one other propulsor of the at least two propulsors may be zero. For example, this may be done to simplify the calculation of the target phase shift. Alternatively, the pairwise phase difference between the digital propulsor 152 and at least one other propulsor of the at least two propulsors may be non-zero. The cost equation may be minimized iteratively by the supervisory controller 300 (e.g., continually testing $TPS_1$, $TPS_2$, $TPS_3$, and $TPS_4$ values to converge on a minimum value of the cost function while keeping equations 4 through 7 true).

Notably, each of the propulsors in the two or more propulsors (e.g., the first propulsor, the second propulsor, the third propulsor, and the fourth propulsor) may be compared against the digital propulsor 152. For example, the pairwise phase difference of each propulsor may be compared to the pairwise phase difference of the digital propulsor 152, which may be advantageously utilized for determining the target phase shift of each propulsor.

In exemplary embodiments, the controller logic 350 may further include, adjusting the angles 302 of each propulsor of the at least two propulsors according to the determined $TPS_1$, $TPS_2$, $TPS_3$, and $TPS_4$ that minimize the cost function, thereby achieving the desired RPA(s). Adjusting the angles 302 may include independently adjusting each of the angles $\theta$ according to the determined TPS (e.g., shifting the phase by a certain number of degrees). In exemplary implementations, this may be executed at (314) by adjusting a speed of each propulsor of the at least two propulsors based on the target phase shift until the pairwise phase difference is equal to the reference phase angle. For example, if the pairwise phase difference is equal to about 30° (i.e., the difference between $\theta_1$ and $\theta_2$ is equal to about 30°), and the reference phase angle is generated to equal to about 15°, then the $TPS_1$ and $TPS_2$ may be determined (e.g., by minimizing a cost function) and the speed of each propulsor adjusted until the pairwise phase difference is reduced from 30° to about 15°. By minimizing the cost function, the system may determine that $TPS_1$ is positive 10° and $TPS_2$ is negative 5°. That is, in order to accomplish the desired reference phase angle of about 15° when the current pairwise phase difference is about 30°, the first propulsor needs a positive phase shift by about 10°, and the second propulsor needs a negative phase shift by about 5°. The positive phase shift may be performed by speeding up (i.e., increasing the speed) the first propulsor, and the negative phase shift may be performed by slowing down (i.e., reducing the speed) the first propulsor.

For example, the supervisory controller 300 may generate one or more control signals 301, which may be communicated to one or more controllable devices 304 of each of the propulsors 52, 53, 54, 55. For example, the controllable devices 304 may include electric machines 316, such as the electric machines 56-1 and 56-2 described above with reference to FIG. 3. The controllable devices 304 may further include a fuel delivery system 318, such as the fuel delivery system 151 described above with reference to FIGS. 3 and 4. The controllable devices 304 may further include a fan blade pitch 320, e.g., by actuating the actuation members 132 connected to the fan blades 128 (see FIG. 3).

The speed (rotational speed of the shafts) and angles 302 (and thus phase angles) may be adjusted by the electric machines 316 by adjusting a rotational speed of the shaft, which may be accomplished by transferring power (e.g., adding or removing) between the electric machine 316 and the shaft. Particularly, speed and angles 302 (and thus phase angles) may be adjusted transferring power (e.g., adding or removing) between the electric machine 316 and the LP shaft. Additionally, the speed (e.g., rotational speed) and angles 302 (and thus phase angles) may be adjusted by adjusting an amount of fuel provided to the combustion section of the propulsors. Further, speed and angles 302 (and thus phase angles) may be adjusted by adjusting the fan blade pitch.

Figure 7:
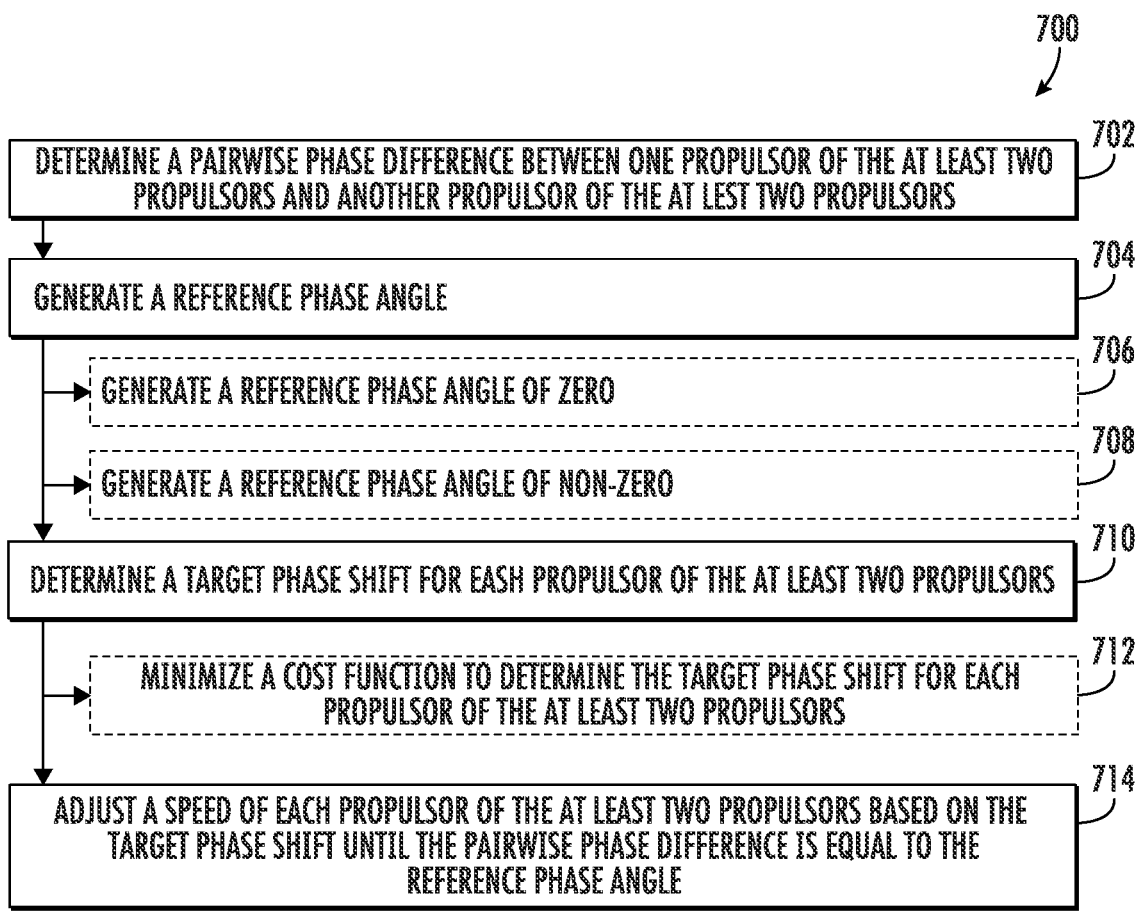
FIG. 7 is a flow chart of a method of operating a propulsion system in accordance with embodiments of the present disclosure.

Referring now to FIG. 7, a flow diagram of one embodiment of a method 700 of operating a propulsion system is illustrated in accordance with embodiments of the present subject matter. In general, the method 700 will be described herein with reference to the propulsion system 50, the propulsors 52, 53, 54, 55, the aircraft 10, gas turbine engine 100, the supervisory controller 300, and the control logic 350 described above with reference to FIGS. 1-6. However, it will be appreciated by those of ordinary skill in the art that the disclosed method 700 may generally be utilized with any suitable turbomachine and/or may be utilized in connection with a system having any other suitable system configuration. In addition, although FIG. 7 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As discussed above, the propulsion system of the method 700 may include at (702) determining a pairwise phase difference (PPD) between one propulsor of the at least two propulsors and another propulsor of the at least two propulsors. A pairwise phase difference (i.e., the phase angle for a particular two propulsors) may be the the difference between the angle $\theta$ of one propulsor of the at least two propulsors and the angle $\theta$ of another propulsor of the at least two propulsors at an instance in time. For example, at a particular instance in time (i.e., a moment in time), the supervisory controller may determine or receive (e.g., by measuring, sensing, or estimating) angles between a reference line and a propeller blade of each of the fans closest to the reference line, and these angles may then be compared (e.g., by taking an absolute value of the difference) to one another to determine the pairwise phase difference.

In a propulsion system or aircraft having more than two propulsors, the method 700 may include generating a plurality of pairs of propulsors all relative to the same reference propulsor (e.g., a first pair between propulsor one and propulsor two, a second pair between propulsor one and propulsor three, a third pair between propulsor one and propulsor four, etc.). Subsequently, the method 700 may include generating a pairwise phase difference for each pair of propulsors.

In exemplary implementations, the method 700 may further include at (704) generating a reference phase angle that is different than the pairwise phase difference. For example, a reference phase angle may be a desired or target pairwise phase difference between a given pair of propulsors that is different than the current pairwise phase difference between the same pair of propulsors. The reference phase angle may be generated based on operating conditions of the propulsors. In this way, the method 700 may include generating a reference phase angle for each pair of propulsors. In some implementations, method 700 may include generating a reference phase angle for one or more pairs of propulsors of the plurality of pairs of propulsors that is different than one another (e.g., the first pair of propulsors has a first reference phase angle that is different than a second reference phase angle for the second pair of propulsors, and so forth). Alternatively, or additionally, the method 700 may include generating a reference phase angle for one or more pairs of propulsors of the plurality of pairs of propulsors that is the same (e.g., equal).

Particularly, as shown in FIG. 7, the method may include at (706) generating a reference phase angle of zero. More particularly, the method 700 may include generating a reference phase angle of zero for one or more pairs of propulsors of the plurality of pairs of propulsors, such that the one or more pairs of propulsors will eventually be driven to a pairwise phase difference of zero after the speed is adjusted. Alternatively, or additionally, the method may include at (708) generating a reference phase angle of non-zero. More particularly, the method 700 may include generating a reference phase angle of non-zero for one or more pairs of propulsors of the plurality of pairs of propulsors, such that the one or more pairs of propulsors will eventually be driven to a pairwise phase difference of non-zero after the speed is adjusted.

In exemplary implementations, the method 700 may further include at (710) determining a target phase shift for each propulsor of the at least two propulsors at least partially based on the reference phase angle and the pairwise phase difference. The target phase shift may be an amount (e.g., in degrees) that the angles θ of each propulsor may be adjusted (e.g., by adding/removing power with an electric machine, adjusting an amount of fuel provided to the combustion section, and/or adjusting a pitch of the fan blades) to achieve the generated reference phase angle(s). In many implementations, the method 700 may include at (712) minimizing a cost function to determine the target phase shift for each propulsor of the at least two propulsors. Minimizing the cost function may be done iteratively, e.g., by continually testing values of target phase shift to eventually converge on a minimum of the cost function.

In many implementations, the method may include adjusting the angles θ of each propulsor of the at least two propulsors according to the determined target phase shifts that minimize the cost function, thereby achieving the desired RPA(s). Adjusting the angles θ may include independently adjusting each of the angles θ according to the determined target phase shift (e.g., by independently shifting the angles θ by a certain number of degrees). In exemplary implementations, the method 700 may include at (714) adjusting a speed of each propulsor of the at least two propulsors based on the target phase shift until the pairwise phase difference is equal to the reference phase angle. Particularly, the controller may instruct the gas turbine system to adjust a speed of each propulsor of the at least two propulsors based on the target phase shift until the pairwise phase difference is equal to the reference phase angle. The speed (rotational speed of the HP and/or LP shaft) and angles (and thus phase angles) of each propulsor may be adjusted by an electric machine coupled to the LP shaft and/or the HP shaft of each respective propulsor. For example, the electric machine may transfer power (e.g., add power or remove power) between the electric machine and the shaft. Particularly, speed and angles 302 (and thus phase angles) may be adjusted by transferring power (e.g., adding or removing) between the electric machine 316 and the shaft. Additionally, or alternatively, the speed (e.g., rotational speed of the shaft) and angles 302 (and thus phase angles) may be adjusted by adjusting an amount of fuel provided to the combustion section with the fuel delivery system. In various implementations, the rotational speed of the shaft may be adjusted over a time period to achieve the desired RPA(s).

Figure 8:
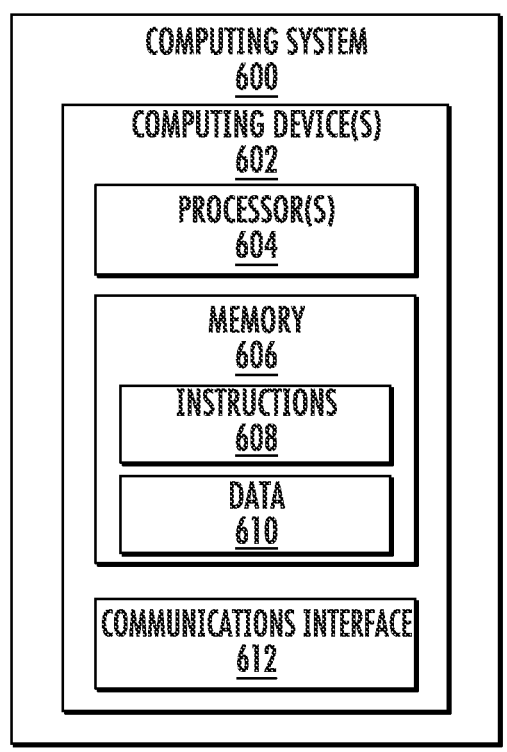
FIG. 8 provides a block diagram of a computing system for implementing one or more aspects of the present disclosure according to example embodiments of the present disclosure.

FIG. 8 provides a block diagram of an example computing system 600. The computing system 600 can be used to implement the aspects disclosed herein. The computing system 600 can include one or more computing device(s) 602. The controller 72, the first gas turbine engine controller 156, the second gas turbine engine controller 158, the supervisory controller 300, and/or the fuel controller disclosed herein can be constructed and may operate in a same or similar manner as one of the computing devices 602, for example.

As shown in FIG. 8, the one or more computing device(s) 602 can each include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable or computer-executable instructions 608 that can be executed by the one or more processor(s) 604. The instructions 608 can be any set of instructions or control logic that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations.

The memory device(s) 606 can further store data 610 that can be accessed by the processor(s) 604. For example, the data 610 can include sensor data such as engine parameters, model data, logic data, etc., as described herein. The data 610 can include one or more table(s), function(s), algorithm(s), model(s), equation(s), etc. according to example embodiments of the present disclosure.

The one or more computing device(s) 602 can also include a communication interface 612 used to communicate, for example, with the other components of the aircraft. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Although specific features of various embodiments may be shown in some drawings and not in others, this is for convenience only. In accordance with the principles of the present disclosure, any feature of a drawing may be referenced and/or claimed in combination with any feature of any other drawing.

The present disclosure provides various control methods for generating a target phase shift value that is optimized according to a cost function, thereby allowing each of the propulsors shift phase independently of one another to achieve the reference phase angle in the most efficient manner. This may be advantageous over, e.g., modifying the phase angle by having one propulsor shift angle while the other does not because it is less time and energy consuming, which positively impacts performance of the propulsion system.

Further aspects are provided by the subject matter of the following clauses:

A propulsion system comprising: at least two propulsors, the at least two propulsors each comprising a fan having a plurality of fan blades; and a controller including memory and one or more processors, the memory storing instructions that when executed by the one or more processors cause the system to perform the following: determine a pairwise phase difference between one propulsor of the at least two propulsors and another propulsor of the at least two propulsors; generate a reference phase angle that is different than the pairwise phase difference; determine a target phase shift for each propulsor of the at least two propulsors at least partially based on the reference phase angle and the pairwise phase difference; and adjust a speed of each propulsor of the at least two propulsors based on the target phase shift until the pairwise phase difference is equal to the reference phase angle.

The propulsion system of any preceding clause, wherein the target phase shift for each propulsor is determined such that a cost function is minimized.

The propulsion system of any preceding clause, wherein the at least two propulsors comprises a first propulsor, a second propulsor, and a third propulsor, wherein the pairwise phase difference is a first pairwise phase difference between the first propulsor and the second propulsor, and wherein the one or more processors are further configured to: determine a second pairwise phase difference between the first propulsor and the third propulsor, and wherein the first pairwise phase difference is different than the second pairwise phase difference.

The propulsion system of any preceding clause, wherein at least one propulsor of the at least two propulsors is a digital propulsor.

The propulsion system of any preceding clause, wherein a pairwise phase difference between the digital propulsor and at least one other propulsor of the at least two propulsors is zero.

The propulsion system of any preceding clause, wherein the at least two propulsors comprises a first propulsor and a second propulsor, the first propulsor includes a first fan having a first plurality of fan blades, the second propulsor has a second fan having a second plurality of fan blades, wherein the first propulsor defines a first angle between a first top dead center (TDC) reference line and a fan blade of the first plurality of fan blades closest to the first TDC reference line at an instance in time, wherein the second propulsor defines a second angle between a second TDC reference line and a fan blade of the second plurality of fan blades closest to the second TDC reference line at the instance in time, and wherein the pairwise phase difference is a difference between the first angle and the second angle at the instance in time.

The propulsion system of any preceding clause, wherein each propulsor of the at least two propulsors further comprises a shaft and an electric machine operably connected to the shaft, and wherein adjusting the speed of each propulsor of the at least two propulsors comprises: adjusting a rotational speed of the shaft by transferring power between the electric machine and the shaft.

The propulsion system of any preceding clause, wherein each propulsor of the at least two propulsors further comprises a fuel delivery system operably connected to a combustion section, and wherein adjusting the speed of each propulsor of the at least two propulsor further comprises: adjusting an amount of fuel supplied to the combustion section with the fuel delivery system.

The propulsion system of any preceding clause, wherein the reference phase angle is non-zero.

A method of operating a propulsion system, the propulsion system comprising at least two propulsors, the at least two propulsors each comprising a fan having a plurality of fan blades, the method comprising: determining a pairwise phase difference between one propulsor of the at least two propulsors and another propulsor of the at least two propulsors; generating a reference phase angle that is different than the pairwise phase difference; determining a target phase shift for each propulsor of the at least two propulsors at least partially based on the reference phase angle and the pairwise phase difference; and adjusting a speed of each propulsor of the at least two propulsors based on the target phase shift until the pairwise phase difference is equal to the reference phase angle.

The method of any preceding clause, wherein the target phase shift for each propulsor is determined such that a cost function is minimized.

The method of any preceding clause, wherein the at least two propulsors comprises a first propulsor, a second propulsor, and a third propulsor, wherein the pairwise phase difference is a first pairwise phase difference between the first propulsor and the second propulsor, and wherein the method further comprises: determine a second pairwise phase difference between the first propulsor and the third propulsor, and wherein the first pairwise phase difference is different than the second pairwise phase difference.

The method of any preceding clause, wherein at least one propulsor of the at least two propulsors is a digital propulsor.

The method of any preceding clause, wherein a pairwise phase difference between the digital propulsor and at least one other propulsor of the at least two propulsors is zero.

The method of any preceding clause, wherein the at least two propulsors comprises a first propulsor and a second propulsor, the first propulsor includes a first fan having a first plurality of fan blades, the second propulsor has a second fan having a second plurality of fan blades, wherein the first propulsor defines a first angle between a first top dead center (TDC) reference line and a fan blade of the first plurality of fan blades closest to the first TDC reference line at an instance in time, wherein the second propulsor defines a second angle between a second TDC reference line and a fan blade of the second plurality of fan blades closest to the second TDC reference line at the instance in time, and wherein the pairwise phase difference is a difference between the first angle and the second angle at the instance in time.

The method of any preceding clause, wherein each propulsor of the at least two propulsors further comprises a shaft and an electric machine operably connected to the shaft, and wherein adjusting the speed of each propulsor of the at least two propulsors comprises: adjusting a rotational speed of the shaft by transferring power between the electric machine and the shaft.

The method of any preceding clause, wherein each propulsor of the at least two propulsors further comprises a fuel delivery system operably connected to a combustion section, and wherein adjusting the speed of each propulsor of the at least two propulsor further comprises: adjusting an amount of fuel supplied to the combustion section with the fuel delivery system.

The method of any preceding clause, wherein the reference phase angle is non-zero.

The method of any preceding clause, wherein the cost function is minimized iteratively by continually testing target phase shift values to converge on a minimum target phase shift for each propulsor of the at least two propulsors.

A controller in communication with a gas turbine system, the controller including memory and one or more processors, the memory storing instructions that when executed by the one or more processors cause the system to perform the following: determine a pairwise phase difference between one propulsor of at least two propulsors and another propulsor of the at least two propulsors of the gas turbine system; generate a reference phase angle that is different than the pairwise phase difference; determine, with a cost function, a target phase shift for each propulsor of the at least two propulsors at least partially based on the reference phase angle and the pairwise phase difference; and instruct the gas turbine system to adjust a speed of each propulsor of the at least two propulsors based on the target phase shift until the pairwise phase difference is equal to the reference phase angle.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A propulsion system comprising:
   at least two propulsors, the at least two propulsors each comprising a fan having a plurality of fan blades; and
   a controller including memory and one or more processors, the memory storing instructions that when executed by the one or more processors cause the system to perform the following:
      determine a pairwise phase difference between one propulsor of the at least two propulsors and another propulsor of the at least two propulsors;
      generate a reference phase angle that is different than the pairwise phase difference;
      determine a target phase shift for each propulsor of the at least two propulsors at least partially based on the reference phase angle and the pairwise phase difference, wherein the target phase shift is a minimum angle adjustment for each propulsor of the at least two propulsors to collectively achieve the reference phase angle; and
      adjust a speed of each propulsor of the at least two propulsors based on the target phase shift until the pairwise phase difference is equal to the reference phase angle.

2. The propulsion system of claim 1, wherein the target phase shift for each propulsor is determined such that a cost function is minimized, wherein minimizing the cost function results in the target phase shift being the minimum angle adjustment for each propulsor of the at least two propulsors.

3. The propulsion system of claim 1, wherein the at least two propulsors comprises a first propulsor, a second propulsor, and a third propulsor, wherein the pairwise phase difference is a first pairwise phase difference between the first propulsor and the second propulsor, and wherein the one or more processors are further configured to:
   determine a second pairwise phase difference between the first propulsor and the third propulsor, and wherein the first pairwise phase difference is different than the second pairwise phase difference.

4. The propulsion system of claim 1, wherein at least one propulsor of the at least two propulsors is a digital propulsor.

5. The propulsion system of claim 1, wherein the at least two propulsors comprises a first propulsor and a second propulsor, the first propulsor includes a first fan having a first plurality of fan blades, the second propulsor has a second fan having a second plurality of fan blades, wherein the first propulsor defines a first angle between a first top dead center (TDC) reference line and a fan blade of the first plurality of fan blades closest to the first TDC reference line at an instance in time, wherein the second propulsor defines a second angle between a second TDC reference line and a fan blade of the second plurality of fan blades closest to the second TDC reference line at the instance in time, and wherein the pairwise phase difference is a difference between the first angle and the second angle at the instance in time.

6. The propulsion system of claim 1, wherein each propulsor of the at least two propulsors further comprises a shaft and an electric machine operably connected to the shaft, and wherein adjusting the speed of each propulsor of the at least two propulsors comprises:
   adjusting a rotational speed of the shaft by transferring power between the electric machine and the shaft.

7. The propulsion system of claim 1, wherein each propulsor of the at least two propulsors further comprises a fuel delivery system operably connected to a combustion section, and wherein adjusting the speed of each propulsor of the at least two propulsor further comprises:
   adjusting an amount of fuel supplied to the combustion section with the fuel delivery system.

8. The propulsion system of claim 1, wherein the reference phase angle is non-zero.

9. A controller in communication with a gas turbine system, the controller including memory and one or more processors, the memory storing instructions that when executed by the one or more processors cause the system to perform the following:
   determine a pairwise phase difference between one propulsor of at least two propulsors and another propulsor of the at least two propulsors of the gas turbine system;
   generate a reference phase angle that is different than the pairwise phase difference;
   determine, with a cost function, a target phase shift for each propulsor of the at least two propulsors at least partially based on the reference phase angle and the pairwise phase difference, wherein the target phase shift is a minimum angle adjustment for each propulsor of the at least two propulsors to collectively achieve the reference phase angle; and instruct the gas turbine system to adjust a speed of each propulsor of the at least two propulsors based on the target phase shift until the pairwise phase difference is equal to the reference phase angle.

* * * * *